April 23, 1946. W. O. SCHULTZ ET AL Re. 22,747

CUT-OUT CONSTRUCTION

Original Filed Feb. 6, 1943 4 Sheets-Sheet 1

INVENTOR.
WILLIAM O. SCHULTZ
ALWIN G. STEINMAYER

BY Austin R. Woolfolk
ATTORNEY.

April 23, 1946. W. O. SCHULTZ ET AL Re. 22,747

CUT-OUT CONSTRUCTION

Original Filed Feb. 6, 1943 4 Sheets-Sheet 2

INVENTORS
WILLIAM O. SCHULTZ
ALWIN G. STEINMAYER

BY Arthur R. Woolpert
ATTORNEY.

April 23, 1946. W. O. SCHULTZ ET AL Re. 22,747
CUT-OUT CONSTRUCTION.
Original Filed Feb. 6, 1943 4 Sheets-Sheet 3
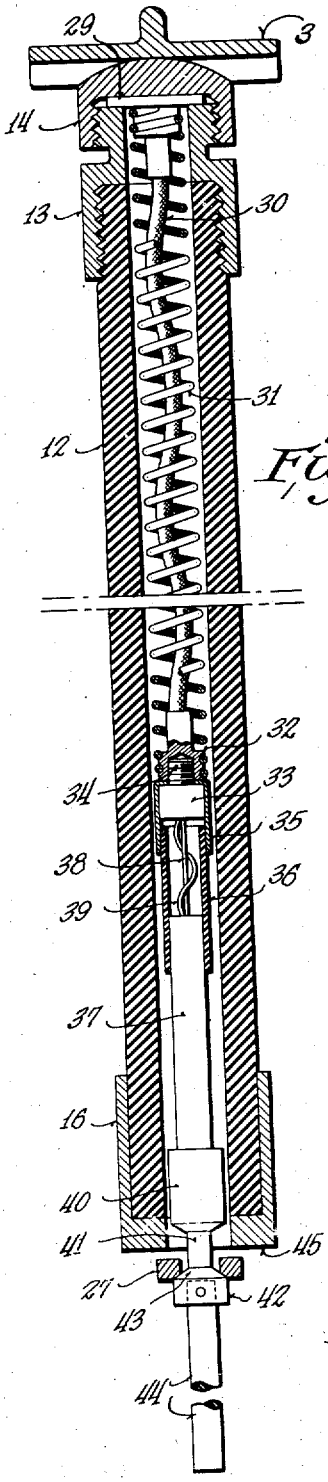
Fig.5
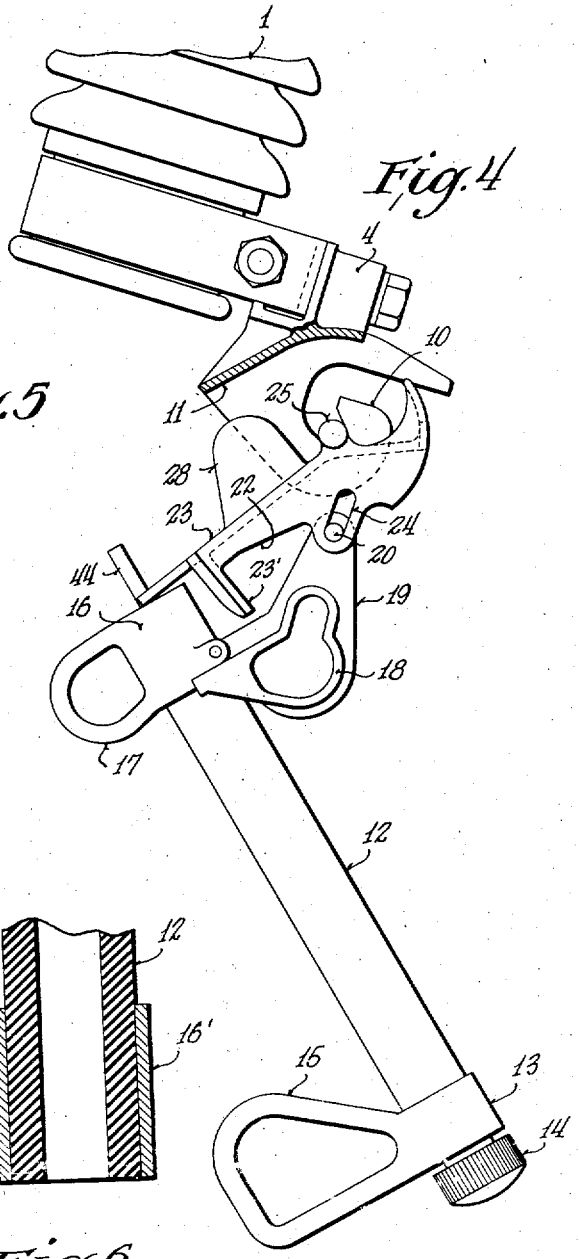
Fig.4
Fig.6
INVENTORS
WILLIAM O. SCHULTZ
ALWIN G. STEINMAYER
BY Arthur R. Woolfolk
ATTORNEY.

April 23, 1946. W. O. SCHULTZ ET AL Re. 22,747

CUT-OUT CONSTRUCTION

Original Filed Feb. 6, 1943 4 Sheets-Sheet 4

INVENTORS
WILLIAM O. SCHULTZ
ALWIN G. STEINMAYER

BY Arthur R. Woolfolk
ATTORNEY.

Reissued Apr. 23, 1946

Re. 22,747

UNITED STATES PATENT OFFICE 22,747

CUTOUT CONSTRUCTION

William O. Schultz, South Milwaukee, and Alwin G. Steinmayer, Milwaukee, Wis., assignors to Line Material Company, Milwaukee, Wis., a corporation of Delaware Original No. 2,362,314, dated November 7, 1944, Serial No. 474,938, February 6, 1943. Application for reissue January 31, 1946, Serial No. 644,605

17 Claims. (Cl. 200—114)

This invention relates to cut-out constructions.

The primary object of this invention is to provide a cut-out which operates as a drop-out fuse device under electrical overload and which also may be operated manually to open the circuit under load without damage to the apparatus.

Further objects are to provide a device as set forth hereinabove which is so made that the fuse link construction is not damaged when the device is manually operated under load but in which means are provided for reestablishing the position of the fuse construction for further service after the device has been manually operated so that the same fuse construction can be used over and over unless such fuse construction has been ruptured by an electrical overload in the automatic operation of the apparatus.

Further objects are to provide a construction in which the circuit is interrupted within the fuse tube whether the cut-out is operated automatically upon electrical overload or manually during load, the construction also providing for the automatic outward and downward dropping of the cut-out after the circuit has been first ruptured within the tube itself, the construction insuring for the expulsive arc extinguishing action whether the circuit is opened manually or automatically.

Further objects are to provide a cut-out construction which may employ a simple type of rigid upper stationary contact, which is so made that the fuse tube may be repositioned by means of a switch stick although it is equipped for both manual and automatic operation as the ordinary type of fuse device, and which is adapted when manually operated to be manipulated by means of a switch stick so that the operator is out of the danger zone at the time the cut-out interrupts the circuit.

Further objects are to provide a cut-out construction which has both the automatic operation under electrical overload and the manual operation and in which a part at least of the composite fuse link construction is drawn upwardly into the fuse tube when the device operates automatically, and in which the lower portion of the composite fuse link construction is bodily drawn upwardly into the fuse tube when the device is manually operated, thereby securing in both cases a certain and assured clearing of the circuit within the fuse tube itself prior to the outward dropping of the fuse tube.

Further objects are to provide a construction which although having the features of both automatic and manual operation is nevertheless of relatively simple construction.

Embodiments of the invention are shown in the accompanying drawings, in which:

Figure 4 is a view, partly broken away and partly in section, showing the device after it has dropped to open position.

Figure 5 is a sectional view on the line 5—5 of Figure 1.

Figure 6 is a fragmentary view of a modified form of the invention.

Figure 1:
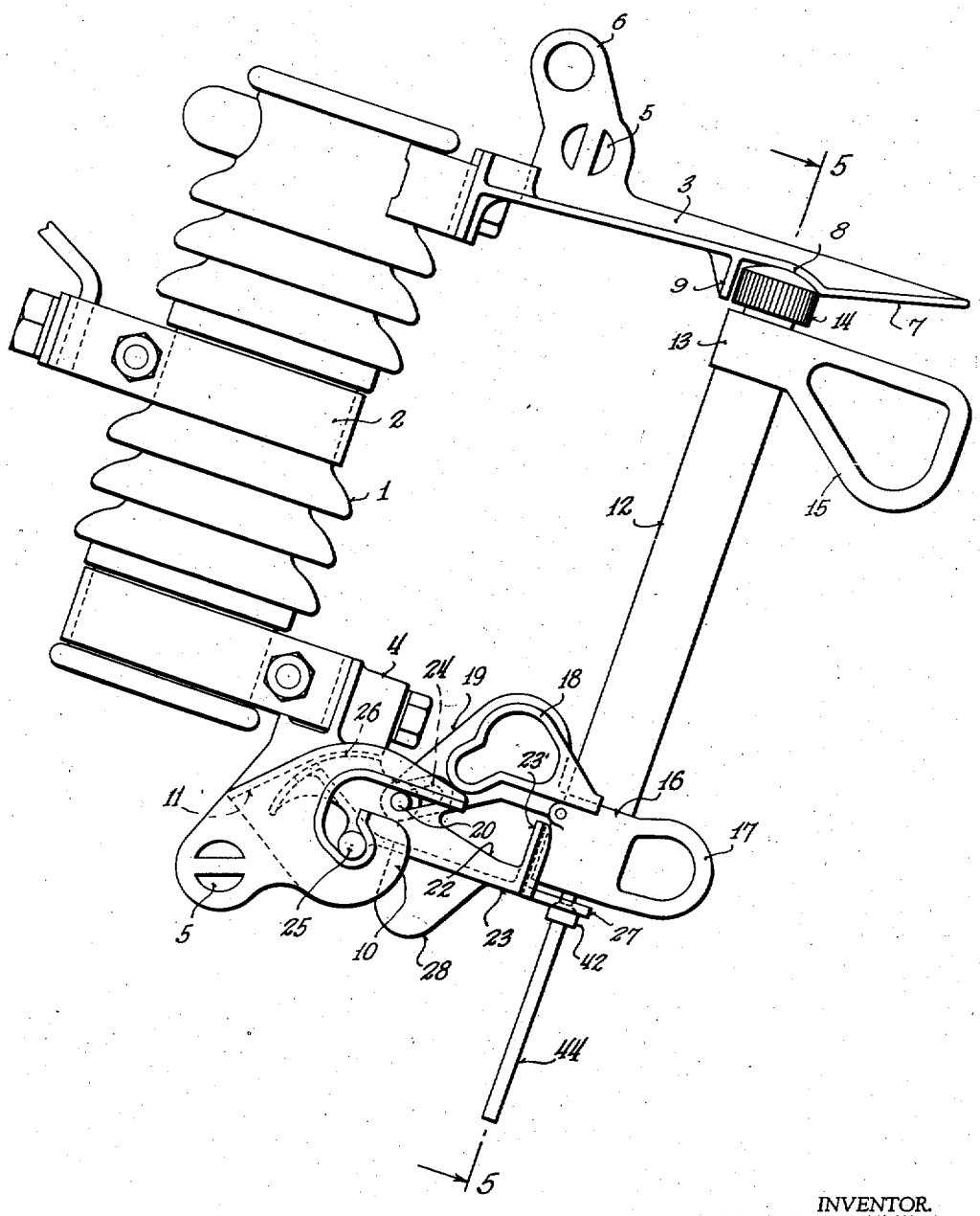
Figure 1 is a side elevation of one form of the apparatus showing the device in closed position.

Referring to Figures 1 to 5, it will be seen that the cut-out comprises a suitable support, such as an elongated insulator 1, which may be supported intermediate its ends in any suitable manner as by means of the clamp 2. The upper end of the insulator carries the upper terminal indicated generally at 3 and the lower end of the insulator carries a lower terminal indicated generally at 4. The upper and lower terminals are provided with apertures 5 for the reception of connectors and one or both of the terminals may be provided with a tie eyelet portion indicated at 6 for the upper terminal.

The upper terminal extends outwardly and terminates in an upwardly bevelled lip portion 7 which is provided with an upwardly recessed portion 8 and with a stop flange 9 rearwardly of such depression.

The lower terminal 4 is provided with a pair of hook-like members or supporting members 10 which are joined by means of a flange portion 11.

The cut-out comprises a fuse tube 12 of fiber or suitable material provided with an upper terminal 13 including the clamping cap 14 which has a rounded upper end normally fitting beneath the recessed or latching portion 8 of the upper stationary terminal. A manipulating eyelet portion 15 is formed integrally with the upper fuse terminal 13.

The lower portion of the fuse is provided with a collar 16 rigidly secured thereto which is equipped with a manipulating eyelet 17 on its outer side and with a manipulating eyelet portion 13 on its inner side. The eyelet portion 18 is formed in the arm 19 which is integral with the sleeve 16. This arm extends rearwardly and downwardly and is provided with pivot pins 20 projecting from opposite sides thereof. These pivot pins extend outwardly from the shouldered portions 21 of the arm 19, as shown most clearly in Figure 2, the shouldered portions 21 constituting spacing members and being located between the channel like walls 22 of a lever 23. The lever 23 is provided with slots 24 within which the pivot pins 20 are slidably and pivotally mounted. The lever 23 is also provided with outwardly projecting trunnions 25 which are removably seated in the hook like supporting members 10. The lever 23 at its rear portion is provided with a rounded flange 26 which is positioned beneath the flange 11 and assists in preventing upward recoil when the fuse blows and also prevents inadvertent detachment of the trunnions 25 from the hook supports 10 until the device has been rocked downwardly, for example as shown in Figure 4. The lever 23 may be provided with an upwardly extending arm 23' which has a curved flange portion loosely surrounding a part of the collar 16.

Figure 2:
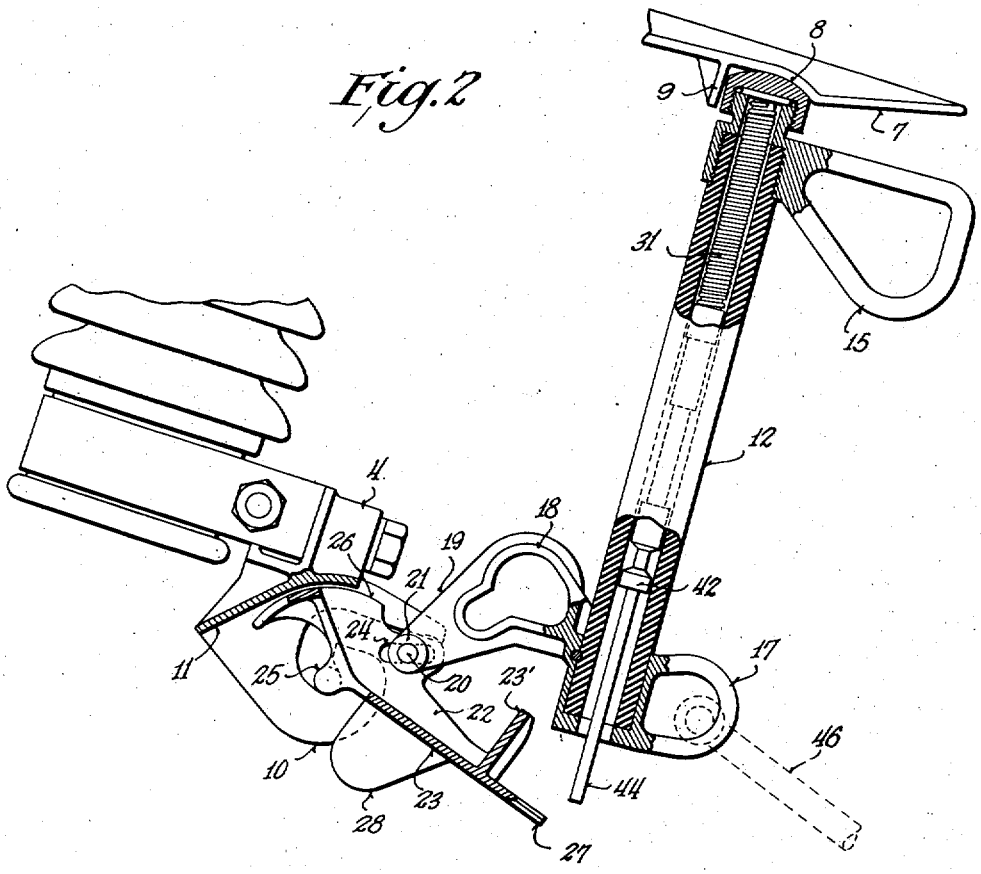
Figure 2 is a view, partly in section and partly broken away, showing the device while it is being manually operated.
Figure 3:
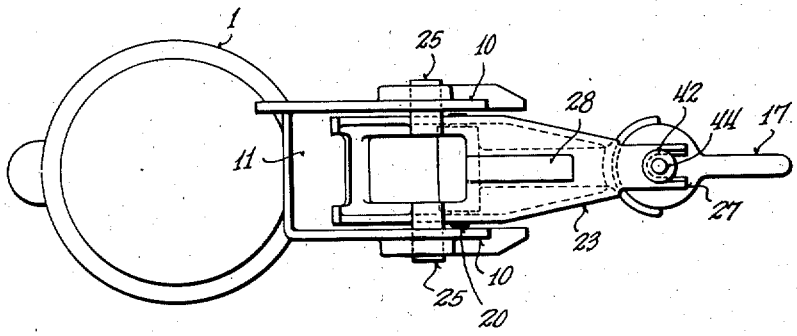
Figure 3 is a bottom view of the device.

It is to be noted that the lever 23 extends forwardly beneath the lower end of the fuse tube and is provided with a pair of fingers constituting a slotted or forked end 27, see particularly Figures 2 and 3. If desired, the lever 23 may be provided with a downwardly extending web 28 which will limit the rearward rocking of the lever when the fuse tube first drops downwardly to its lowest position, as such web will engage the flange 11 if the fuse tube and lever rock to the left past the position shown in Figure 4.

The fuse tube encloses a fuse link construction which includes a buttonhead 29 clamped between the cap 14 and the sleeve 13 at the upper end of the fuse tube 12. A flexible leader 30 extends downwardly from the cap 29 and through a tension spring 31. The lower end of the tension spring is secured to an internally threaded collar 32 constituting the lower terminal of the flexible leader 30.

The fuse unit itself is removable and comprises an upper cylindrical member 33 provided with a threaded stem 34 removably screwed into the member 32. A metallic sleeve 35 is flanged over the upper end of the member 33 and extends downwardly and has preferably a tight fit with a small fiber tube 36. A metallic rod 37 extends upwardly into the small fiber tube 36 and is slidable outwardly from said tube. It is held in place by means of the strain wire 38 and is also connected to the member 33 by means of the fuse wire 39. The rod 37 extends downwardly out of the lower end of the fuse tube and is provided with a centering collar 40 for centering the fuse link with reference to the outer or main fuse tube 12. Below the collar the rod is provided with a reduced portion 41 and with a lower collar 42 which has a bevelled upper surface as indicated at 43. A manipulating rod 44 is either permanently or removably secured within the collar 42. In the form shown in Figure 5 the manipulating rod 44 is permanently secured within the collar 42. The rod, as stated, may be removably secured as will appear from the description of Figure 7 hereinafter.

It is to be noted that the metallic sleeve 16 rigidly secured to the lower end of the fuse tube has a lower flange portion 45 which extends beneath the lower end of the fuse tube. This lower flange 45 may be omitted if desired, for example, as shown for the sleeve 16' in the modified form shown in Figure 6.

The lower collar 42 is normally hooked beneath the forked end 27 of the lever 23 and prevents the springs 31 from contracting and drawing the fuse link and associated parts upwardly into the fuse tube.

The operation of the apparatus under overload is as follows: When an overload occurs, the fuse link 39 and strain wire 38, see Figure 5, are ruptured and the spring 31 draws the members 32 and 33 and the small fiber tube 36 upwardly into the main fuse tube 12. The rod 37 is expelled downwardly and also is pulled downwardly by means of the lever 23, it being noted that the weight of the fuse tube and its associated parts, as well as the weight of the lever 23, biases the lever towards downward motion. It is apparent, therefore, that when the fuse link is ruptured, the rod 37 moves downwardly and releases the lever 23 which upon rocking downwardly moves the lower end of the fuse tube downwardly and outwardly and allows the upper cap 14 of the upper terminal of the fuse tube to detach itself from the latching portion 8 of the upper stationary terminal 3. The fuse tube then drops downwardly to the position shown in Figure 4.

In this position, it is obvious that the fuse tube may be lifted from the hook supports 10 by means of a switch stick coacting with the eyelet portion 18 of the arm 19. The fuse tube is then re-fused and replaced.

The device has another mode of operation when it is desired to manually open the circuit under load. The initiating of this mode of operation is shown in Figure 2 wherein the switch stick indicated in dotted lines at 46 is hooked into the outer lower eyelet 17 at the lower end of the fuse tube and the fuse tube is then drawn to the right as viewed in Figure 2. This causes the collar 42 to slide outwardly from the forked end 27 of the lever 23 and the coil spring or tension spring 31 immediately draws the lower portions of the composite fuse link structure upwardly into the main fuse tube 12. The initial arc strikes between the rod 37, for example the collar portion 40 and the lower flange 45 of the lower fuse terminal or collar 16, see Figure 5, and the arc is drawn into the tube and is immediately extinguished by the expulsion action produced. It is to be noted that the outward rocking of the lower end of the fuse tube when manually manipulated as indicated in Figure 2 is permitted due to the fact that the pivot pins 20 are allowed sliding motion within the elongated slots 24.

When the lever 23 is freed from restraint, it moves downwardly and moves the lower end of the fuse tube downwardly and outwardly and allows the upper end thereof, that is to say, the cap portion 14 to detach itself from the upper stationary contact.

The manual opening of the circuit is accomplished without destroying the fuse link and after the fuse tube has dropped downwardly to its lowest position, it may be removed by means of a switch stick as described. Thereafter it is merely necessary to pull the composite fuse link downwardly by a pull on the manipulating rod 44 and to thereafter detachably lock the lower end of the composite fuse link to the lever 23 as previously described. The fuse tube may then be replaced and rocked back into circuit when it is desired to again close the circuit.

In the form of the invention shown in Figure 6, the arc strikes from the lower end of the sleeve 16′ to the adjacent portion of the rod 37. The purpose of the lower flange 45 is to insure the striking of the arc directly from the sleeve 16 to the adjacent portion of the rod 37, for example the collar 40, and thus insure that the arc will not strike from the lower end of the sleeve 16 to the forked end 27 of the lever 23.

Figure 7:
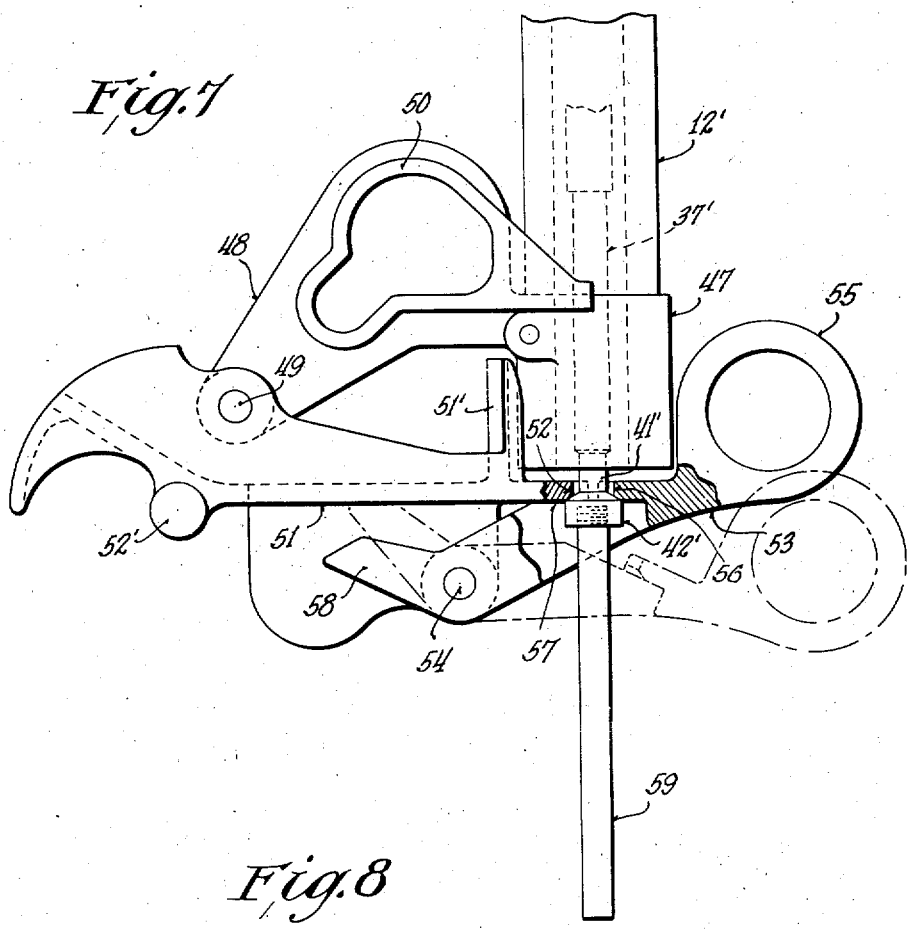
Figure 7 is a fragmentary view, partly in section, of the lower portion of a further modified form of the invention.
Figure 8:
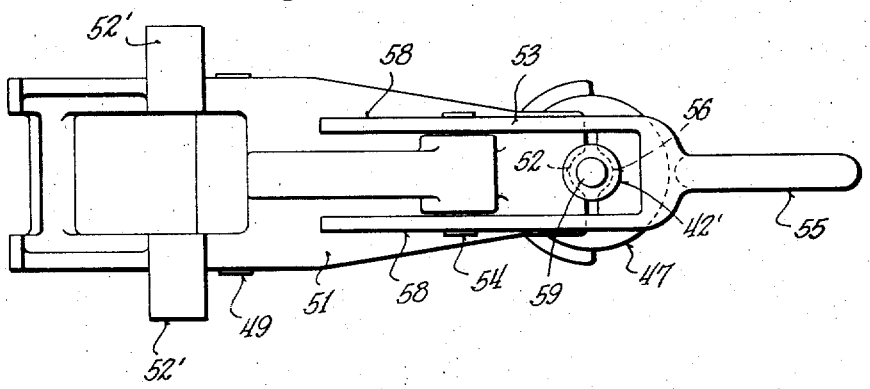
Figure 8 is a bottom view of the structure shown in Figure 7.

In the form of the invention shown in Figure 7, the same general construction of fuse tube 12′ and associated parts is employed. The metallic collar 47 corresponding to the collar 16 at the lower end of the fuse tube is not provided with the outer manipulating eyelet 17, as in the first form of the invention. It is provided with the rearwardly extending arm 48 which is equipped with pivot pins 49 and with a manipulating eyelet portion 50. The arm 48 is pivoted to the lever 51 which carries the trunnions 52′ and whose left-hand portion is constructed in the same manner as that described in connection with Figure 1. The lever 51 may also be provided with an upwardly extending arm 51′ corresponding to the arm 23′ of Figure 1. The lever 51, however, is provided with a notched outer end, the notch being indicated at 52 in Figure 8. This notched end extends less than half way across the lower collar 42′ of the rod 37′ and consequently the lever 51 would not of itself restrain the upward motion of the rod. However, a latching member in the form of a lever indicated generally at 53 is pivotally mounted as indicated at 54 on the lever 51 and is provided with a manipulating eyelet 55 adapted to be engaged by a switch stick. The latching member 53 is also provided with a notched portion indicated at 56 in Figure 8 which coacts with the notched portion 52 of the lever 51 to restrain the collar 42′ and consequently the rod 37′. In this form of the invention there is no need for a centering collar like the collar 40 of Figure 5 as the notches 52 and 56 center the fuse link. The lever or latching member 53 is bifurcated and is provided with shouldered portions 57, see Figure 7, which abut the lower surface of the lever 51 and limit the upward rocking motion of the latching lever 53. The downward rocking motion of the latching lever is limited by means of the extensions 58 which abut the lower surface of the lever 51 when the latching lever is in its down or dotted line position as shown in Figure 7.

The operation of this form of the invention on overload is identically the same as that previously described. The manual operation is slightly different and consists in the fact that the latching lever 53 is first drawn downwardly by means of a switch stick. There is sufficient play between the reduced portion 41′ of the rod 37′ and the notched portions of the levers 51 and 53 to allow the lever 53 to be pulled downwardly. When it is pulled downwardly, the collar 42′ of the rod 37′ is released and the rod is drawn upwardly into the main fuse tube 12′. The manipulating rod 59 is detachably secured to the collar 42′ by means of the threaded connection as indicated or in any other suitable manner.

It is to be distinctly understood that in either form of the invention either the detachable manipulating rod or the permanently secured manipulating rod can be employed. If the manipulating rod is permanently attached, it is made of insulating material. If the manipulating rod is detachable, it may be made of either metal or insulating material.

If the cut-out device is caused to operate by manual manipulation in either form of the invention, the composite fuse link may be pulled downwardly for reengagement by means of the manipulating rod after the fuse tube has been removed from its supports. It is obvious that if the manipulating rod is detachable, it may be inserted through the lower end of the fuse tube and may be engaged in the lower collar portion 42′ of the rod 37′ and thereafter the composite fuse link may be pulled downwardly for reengagement.

It is to be noted that in rocking the cut-out to closed position, the upper terminal of the fuse tube rides beneath the slanting surface 7 until the cap 14 of the upper contact of the fuse tube seats within the recessed portion 8 of the upper stationary contact 3. There is sufficient yield provided by the spring 31, see Figure 5, to allow a slight downward motion of the fuse tube and the associated lever construction at its lower end to allow for this motion.

It is to be understood that the fuse unit consisting of the members 33, 35, 36 and 37 is a renewable unit so that when one fuse unit blows, another may be substituted. It is to be understood also that the composite structure extending through the fuse tube constitutes in reality a fuse link normally electrically connecting the upper and lower stationary terminals.

It will be seen that a novel form of cut-out has been provided which has both automatic and manual operation responding to an overload in an automatic manner and capable of being operated manually to interrupt the circuit under load without damage to the cut-out. It is also to be seen that the composite fuse link is not destroyed when the cut-out is manually opened under load as the same composite fuse link is again put in service as described hereinabove.

It will be seen further that the construction though affording both of these modes of operation is relatively simple and is not much more complicated than the usual type of drop-out expulsion fuse.

Although this invention has been described in considerable detail, it is to be understood that such description is intended as illustrative rather than limiting, as the invention may be variously embodied and is to be interpreted as claimed.

We claim:

1. A fuse device comprising a fuse tube having an open end, a fuse link within said fuse tube adapted to rupture on overload, stationary contacts normally connected to form a circuit through said fuse link, said fuse link having a projecting portion projecting outwardly from the open end of said fuse tube, retracting means tending to withdraw said projecting portion into said fuse tube, restraining means detachably engaging the projecting portion of said fuse link and restraining the said projecting portion, and manually operable means for causing release of said fuse link from said restraining means whereby the circuit will be interrupted within said fuse tube.

2. A fuse device comprising a fuse tube having an open end, a fuse link within said fuse tube adapted to rupture on overload, stationary contacts normally connected to form a circuit through said fuse link, said fuse link having a projecting portion projecting outwardly from the open end of said fuse tube, retracting means tending to withdraw said projecting portion into said fuse tube, restraining means detachably engaging the projecting portion of said fuse link and restraining the said projecting portion, and manually operable means for causing relative motion between said restraining means and said fuse tube to release the projecting portion of said fuse link from said restraining means whereby the circuit will be interrupted within said fuse tube.

3. A cut-out construction comprising a fuse tube having an open end, a fuse link within said fuse tube having a portion projecting outwardly from the open end of said tube, stationary contacts normally connected to form a circuit through said fuse link, said fuse link including a fusible portion operable on electrical overload to interrupt the circuit within said tube, retracting means tending to draw the projecting portion of said fuse link into said tube, restraining means adjacent the open end of said fuse tube for detachably holding the fuse link against motion, and manually operable means for releasing said fuse link from said restraining means, whereby said retracting means will be free to operate and the circuit will be interrupted within said fuse tube.

4. A cut-out construction comprising a fuse tube having an open end, a fuse link within said fuse tube having a portion projecting outwardly from the open end of said tube, stationary contacts normally connected to form a circuit through said fuse link, said fuse link including a fusible portion operable on electrical overload to interrupt the circuit within said tube, retracting means tending to draw the projecting portion of said fuse link into said tube, restraining means adjacent the open end of said fuse tube for detachably holding the fuse link against motion, and manually operable means for releasing said fuse link from said restraining means, whereby said retracting means will be free to operate and the circuit will be interrupted within said fuse tube, said fuse link being undamaged when manual operation takes place.

5. A drop-out cut-out construction comprising a fuse tube having an open end, a fuse link within said fuse tube having a portion projecting outwardly from the open end of said fuse tube, stationary contacts normally connected to form a circuit through said fuse link, said fuse link including a fusible portion operable on electrical overload to interrupt the circuit within said fuse tube, retracting means tending to withdraw the projecting portion of said fuse link into said fuse tube, restraining means adjacent the open end of said fuse tube for detachably holding said fuse link against motion and being itself restrained by said fuse link, said restraining means normally holding said fuse tube against drop-out motion and releasing said fuse tube for drop-out motion when said restraining means is free of restraint from said fuse link, and manually operable means for releasing said fuse link from said restraining means.

6. A drop-out cut-out construction comprising a fuse tube having an open end, a fuse link within said fuse tube having a portion projecting outwardly from the open end of said fuse tube, stationary contacts normally connected to form a circuit through said fuse link, said fuse link including a fusible portion operable on electrical overload to interrupt the circuit within said fuse tube, retracting means tending to withdraw the projecting portion of said fuse link into said fuse tube, restraining means adjacent the open end of said fuse tube for detachably holding said fuse link against motion and being itself restrained by said fuse link, said restraining means normally holding said fuse tube against drop-out motion and releasing said fuse tube for drop-out motion when said restraining means is free of restraint from said fuse link, and manually operable means for releasing said fuse link from said restraining means, the projecting portion of said fuse link when released from said restraining means being drawn into said fuse tube to interrupt the circuit within said fuse tube.

7. A fuse device comprising a fuse tube having an open end, a fuse link within said fuse tube adapted to rupture on overload, stationary contacts normally connected to form a circuit through said fuse link, said fuse link having a projecting portion projecting outwardly from the open end of said fuse tube, retracting means tending to withdraw said projecting portion into said fuse tube, restraining means detachably engaging the projecting portion of said fuse link and restraining the said projecting portion, and means having a portion operable externally of said fuse tube and adapted to receive a switch stick for releasing the projecting portion of said fuse link from said restraining means for breaking the connection between said stationary contacts within said fuse tube independently of load conditions.

8. A fuse device comprising a movably mounted fuse tube having an open end, a fuse link within said fuse tube adapted to rupture on overload, stationary contacts normally connected to form a circuit through said fuse link, said fuse link having a projecting portion projecting outwardly from the open end of said fuse tube, retracting means tending to withdraw said projecting portion into said fuse tube, restraining means detachably engaging the projecting portion of said fuse link and restraining the said projecting portion, and manually operable means engageable by a switch stick for moving said fuse tube with reference to said restraining means to release the projecting portion of said fuse link from said restraining means.

9. A fuse device comprising a fuse tube having an open end, a fuse link within said fuse tube adapted to rupture on overload, stationary contacts normally connected to form a circuit through said fuse link, said fuse link having a projecting portion projecting outwardly from the open end of said fuse tube, retracting means tending to withdraw said projecting portion into said fuse tube, movable restraining means detachably engaging the projecting portion of said fuse link and restraining the said projecting portion, and manually operable means for moving said movable restraining means to detach said restraining means from said fuse link.

10. A fuse device comprising a fuse tube having an open end, a fuse link within said fuse tube adapted to rupture on overload, stationary contacts normally connected to form a circuit through said fuse link, said fuse link having a projecting portion provided with an enlargement normally located beyond the open end of said fuse tube, yieldable retracting means tending to withdraw the projecting portion of said fuse link into said fuse tube, restraining means having a notched portion detachably engaging the enlargement of said fuse link and restraining the projecting portion of said fuse link from retraction into said fuse tube, and manually operable means for causing detachment of said enlargement from the said notched portion of said restraining means.

11. A fuse device comprising a fuse tube having an open end, a fuse link within said fuse tube adapted to rupture on overload, stationary contacts normally connected to form a circuit through said fuse link, said fuse link having a projecting portion projecting outwardly from the open end of said fuse tube, retracting means tending to withdraw said projecting portion into said fuse tube, restraining means detachably engaging the projecting portion of said fuse link and restraining the said projecting portion, manually operable means for causing release of said fuse link from said restraining means whereby the circuit will be interrupted within said fuse tube, and a second manually operable means attached to the end of said fuse link for drawing said fuse link outwardly from the open end of said fuse tube after manual operation of the device.

12. A fuse device comprising a fuse tube having an open end, a fuse link within said fuse tube adapted to rupture on overload, stationary contacts normally connected to form a circuit through said fuse link, said fuse link having a projecting portion projecting outwardly from the open end of said fuse tube, retracting means tending to withdraw said projecting portion into said fuse tube, restraining means detachably engaging the projecting portion of said fuse link and restraining the said projecting portion, and manually operable means for causing release of said fuse link from said restraining means whereby the circuit will be interrupted within said fuse tube, the end of said fuse link having means for detachably receiving a withdrawing instrumentality whereby the end of said fuse link may be drawn outwardly from the open end of said fuse tube after manual operation of the device.

13. A fuse device comprising an expulsion fuse tube having an open end, a fuse link within said fuse tube adapted to rupture on overload, stationary contacts normally connected to form a circuit through said fuse link, said fuse link when ruptured on overload interrupting the circuit within said fuse tube, said fuse link having a projecting portion projecting outwardly from the open end of said fuse tube, retracting means tending to withdraw said projecting portion into said fuse tube, restraining means detachably engaging the projecting portion of said fuse link and restraining the said projecting portion, and manually operable means for causing release of said fuse link from said restraining means whereby the circuit will be interrupted within said fuse tube upon manual release, said device having an expulsion action when interruption occurs either by rupture of the fuse link on overload or by operation of said manual means.

14. A drop-out fuse device comprising a pair of stationary contacts, a fuse tube having an open end, a fuse link within said fuse tube, said fuse link having a projecting portion projecting from the open end of said fuse tube, said fuse tube normally occupying an operative position and biased towards drop-out motion to an inoperative position, retracting means tending to retract the projecting portion of said fuse link into said fuse tube, mechanism normally holding said fuse tube in operative position and including restraining means releasably holding the projecting portion of said fuse link, and manually operable means for causing release of said fuse link from said restraining means, said mechanism releasing said fuse tube for drop-out operation when said fuse link is ruptured on overload or when said fuse link is detached from said restraining means.

15. A drop-out fuse device comprising an upper and a lower stationary contact, said upper contact having a rigid latch portion, a fuse tube having an open lower end and a closed upper end, the upper end of said fuse tube normally having interlocking engagement with the rigid latch portion of said upper stationary contact, a fuse link within said fuse tube extending outwardly from the lower open end thereof, and a lever pivotally supported from said lower contact and controlled by said fuse link for normally holding said fuse tube in operative position and releasable upon overload to release the upper end of said fuse tube from engagement with the rigid latch portion of said upper stationary contact, said fuse link including a resilient portion intermediate its ends to allow the said lever to move with reference to said fuse tube when said fuse tube is rocked into latching engagement with the rigid latch portion of said upper stationary contact.

16. A drop-out fuse device comprising an upper and a lower stationary contact, a fuse tube having a closed upper end normally detachably interlocked with said upper stationary contact and having an open lower end, a fuse link within said fuse tube including an intermediate resilient portion and a portion projecting outwardly from the lower open end of said fuse tube, a lever pivotally supported from the lower contact and having means interengaging with the projecting portion of said fuse link for restraining said fuse link, said lever normally holding said fuse tube in operative position and releasable upon the occurrence of an overload, and means adapted to be engaged by a switch stick for detaching the projecting portion of said fuse link from said lever, the projecting portion of said fuse link when detached from said lever being retracted into said fuse tube by the resilient portion of said fuse link.

17. A fuse device comprising a fuse tube having an open lower end and having a closed upper end, a fuse link within said fuse tube, stationary contacts normally connected to form a circuit through said fuse link, said fuse link having a fusible portion adjacent the lower open end of said fuse tube and located within said fuse tube for interrupting the circuit within said fuse tube on electrical overload, said fuse link having a projecting portion projecting outwardly from the open end of said fuse tube, resilient contractible retracting means located within said fuse tube above said fusible portion and tending to withdraw said projecting portion into said fuse tube, restraining means detachably engaging the projecting portion of said fuse link and restraining the said projecting portion, and manually operable means for causing release of said fuse link from said restraining means whereby the circuit will be interrupted within said fuse tube on manual release.

WILLIAM O. SCHULTZ.
ALWIN G. STEINMAYER.